(12) United States Patent
Arriola, Sr.

(10) Patent No.: US 7,111,896 B1
(45) Date of Patent: Sep. 26, 2006

(54) DEVICE TO SEAL GAP BETWEEN TRUCK WINDOW AND TRUCK CAB

(76) Inventor: David R. Arriola, Sr., 2280 W. 135th Ave., Westminster, CO (US) 80234

( * ) Notice: Subject to any disclaimer, the term of this patent is extended or adjusted under 35 U.S.C. 154(b) by 0 days.

(21) Appl. No.: 11/197,557

(22) Filed: Aug. 4, 2005

(51) Int. Cl.
  *B60J 10/04* (2006.01)
  *B60J 1/18* (2006.01)
(52) U.S. Cl. ............................ 296/166; 296/152
(58) Field of Classification Search ............. 296/166, 296/152, 24.43, 146.9, 146.16, 1.06; 105/8.1
See application file for complete search history.

(56) References Cited

U.S. PATENT DOCUMENTS

| | | | | |
|---|---|---|---|---|
| 3,897,970 A | * | 8/1975 | Gattenby | 296/166 |
| 3,900,224 A | * | 8/1975 | Copeland | 296/166 |
| 4,257,645 A | * | 3/1981 | Balogh | 296/166 |
| 4,279,426 A | * | 7/1981 | Flack, Jr. | 277/630 |
| 4,294,485 A | | 10/1981 | Engelhard | |
| 4,299,422 A | | 11/1981 | Pettit | |
| 4,616,871 A | | 10/1986 | Pettit | |
| 4,940,278 A | | 7/1990 | LePere | |
| 5,067,769 A | * | 11/1991 | Benchoff | 296/166 |
| 5,427,169 A | * | 6/1995 | Saulters | 160/368.1 |
| 5,924,762 A | | 7/1999 | Pols | |
| D416,220 S | | 11/1999 | Danielson | |
| 6,076,470 A | * | 6/2000 | Koch | 105/8.1 |
| 6,702,378 B1 | * | 3/2004 | Bullard | 297/224 |
| 6,742,533 B1 | * | 6/2004 | Olson | 135/95 |
| 2002/0021025 A1 | * | 2/2002 | Lukomskiy | 296/183 |

* cited by examiner

*Primary Examiner*—D. Glenn Dayoan
*Assistant Examiner*—Greg Blankenship
(74) *Attorney, Agent, or Firm*—Lawrence J. Gibney, Jr.

(57) ABSTRACT

A device, which can be folded for storage and zipped together for use. The device provides a connection between the sliding rear window of a truck with the front edge of a camper or cab to eliminate the elements entering the cab or camper.

1 Claim, 4 Drawing Sheets

DEVICE TO SEAL GAP BETWEEN TRUCK WINDOW AND TRUCK CAB

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to providing a device which seals the gap often found between the window of a truck and the front of a cab. It further relates to a removable and easily installed device.

B. Prior Art

Prior Art exists which provides a connection between the truck window and the cab. Examples of this include Pols U.S. Pat. No. 5,924,762, Petit U.S. Pat. No. 4,299,422, and LePere U.S. Pat. No. 4,940,278. However, the structure of the present invention is new and different from that found in the prior art.

BRIEF SUMMARY OF THE INVENTION

The present invention is a lightweight, waterproof, and easy to install flexible boot intended to seal and join an open, sliding rear window of a pickup truck to its companion open, sliding camper window. The present invention will seal out all elements. The present invention has a foldable shape and may be installed and removed as the user desires.

DETAILED DESCRIPTION OF THE EMBODIMENT

Figure 1:
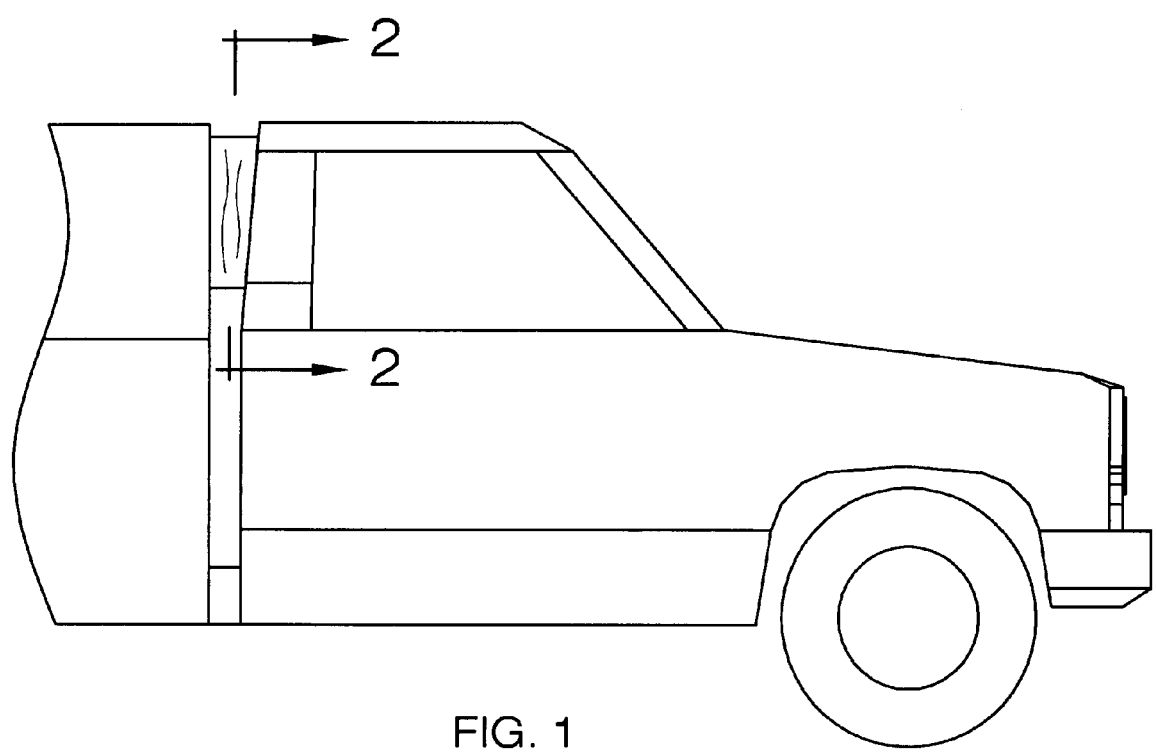
FIG. 1 is a side view of the device installed on a truck.
Figure 2:
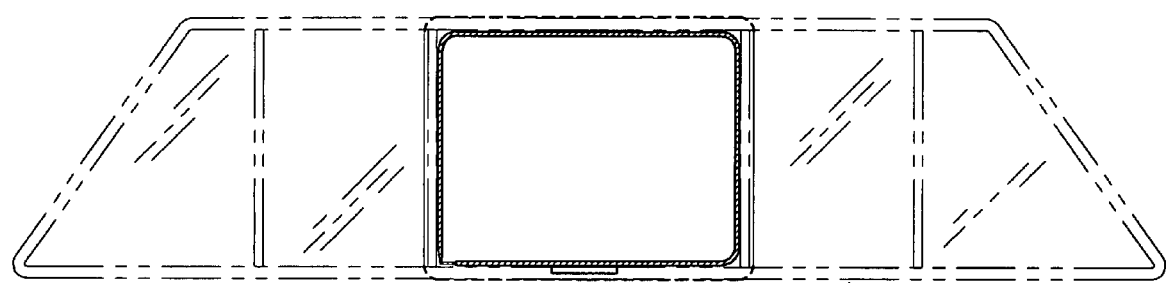
FIG. 2 is front view of the device installed on the truck window.
Figure 3:
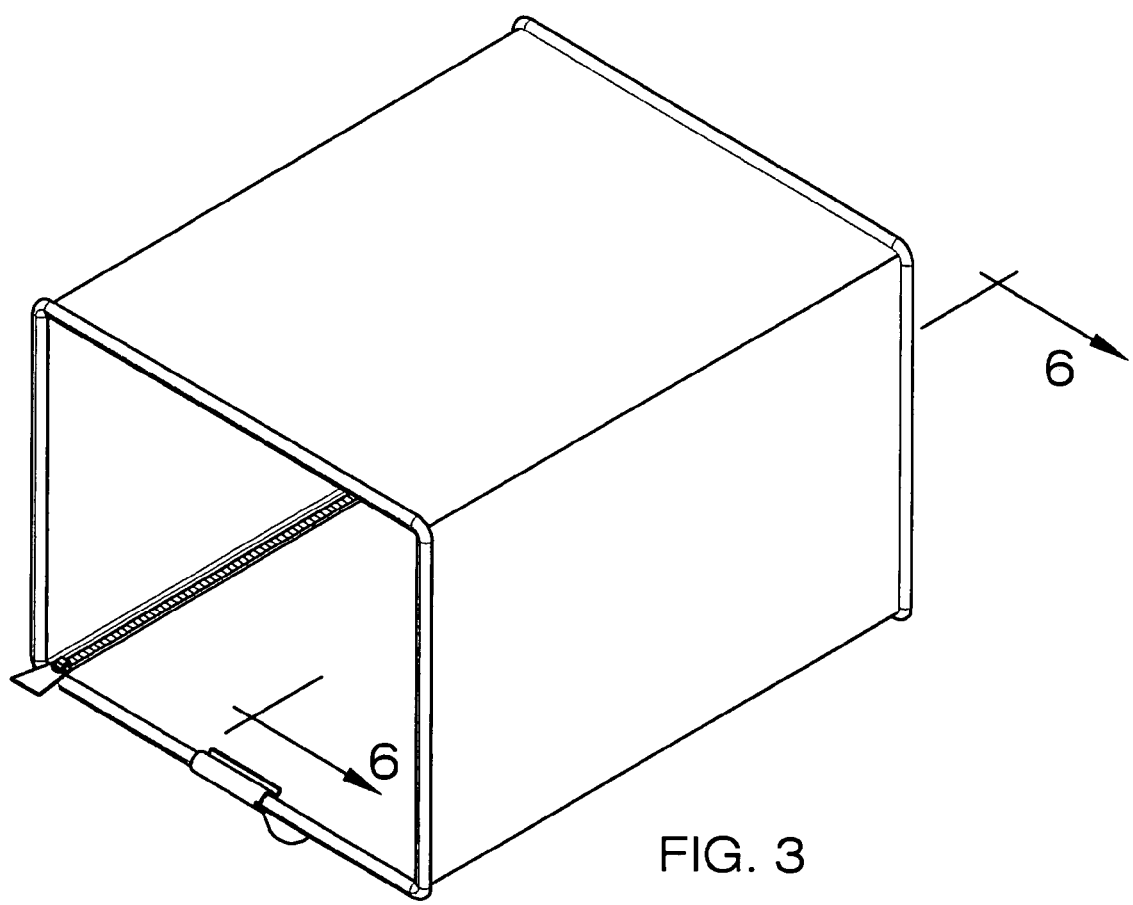
FIG. 3 is an isometric view of the device.
Figure 4:
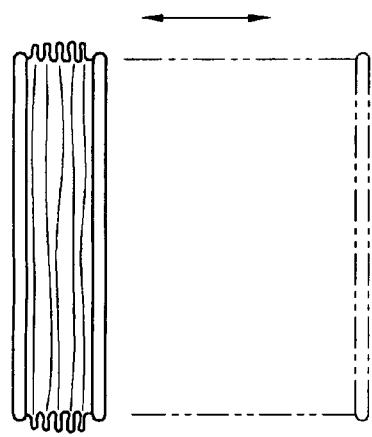
FIG. 4 is a folded front view of the device.
Figure 5:
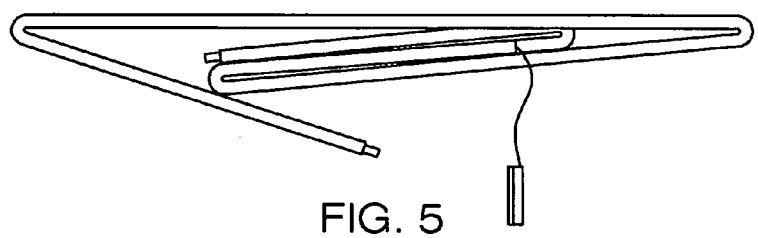
FIG. 5 is a top view of the device folded.

The following numbering will be employed:
5 Boot
6 Rigid Panel
10 Zipper
30 Folding Edges
40 Dowel Rods
50 Folded Boot The present invention is a flexible and foldable boot 5 that is inserted in between the sliding window of a pickup truck and the front of a camper or cab. The boot 5 has four rigid panels 6 which are all of a rectangular shape. FIGS. 1,2,3 The boot 5 also has a zipper 10 located on the edges of two of the panels 6. FIGS. 3,4 When the zipper 10 is zipped, the boot 5 becomes a rigid structure that can be inserted in between the truck window and the camper such as shown in FIGS. 2 and 3. When unzipped, the boot 5 may be kept in a folded state 50. FIG. 5

Figure 7:
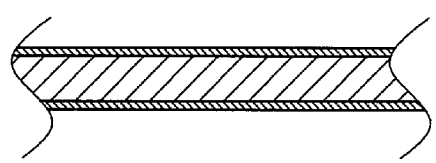
FIG. 7 is a view according to line 7—7 on FIG. 6.
Figure 6:
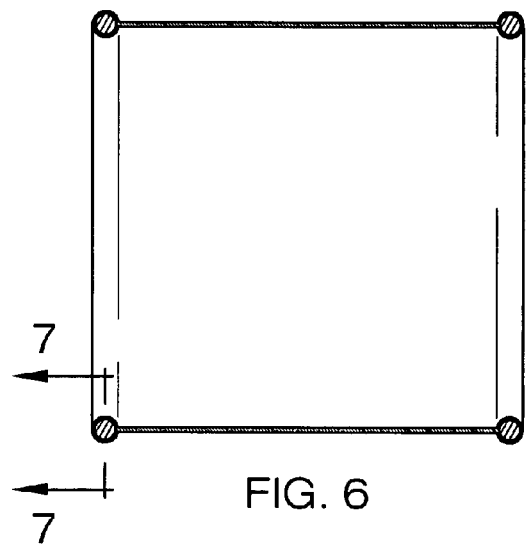
FIG. 6 is a top view of the device.

The boot 5 is made of automotive grade vinyl and uses rigid dowel rods 40 on the edges to maintain the rigidity of the panels 6. FIGS. 6, 7

The invention claimed is:

1. A removable and foldable device for connecting the sliding rear window of a truck with the front of a camper or cab comprising:
   four rectangular rigid panels;
   wherein there are a first, second, third, and fourth panel;
   wherein each panel has a top and bottom edge and a first and second side edge;
   wherein the first panel has a zipper device on the first side edge;
   wherein the fourth panel has a zipper device on the second side edge;
   wherein the second side of the first panel is foldable connected to the first side of the second panel;
   wherein the second side edge of the second panel is foldable connected to the first side edge of the third panel;
   wherein the second side edge of the third panel is foldable connected to the first side edge of the fourth panel;
   wherein the zipper on the first panel temporarily connects with the zipper on the fourth panel;
   a dowel rod is integrated into each top edge and each bottom edge of each panel to provide rigidity.

* * * * *